US011645186B2

(12) United States Patent
Arunachalam

(10) Patent No.: US 11,645,186 B2
(45) Date of Patent: *May 9, 2023

(54) REMOTE DEPLOYMENT OF MONITORING AGENTS ON COMPUTING SYSTEMS

(71) Applicant: Bank of America Corporation, Charlotte, NC (US)

(72) Inventor: Annamalai Arunachalam, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/449,897

(22) Filed: Oct. 4, 2021

(65) Prior Publication Data

US 2022/0035725 A1    Feb. 3, 2022

Related U.S. Application Data

(63) Continuation of application No. 16/943,360, filed on Jul. 30, 2020, now Pat. No. 11,188,437.

(51) Int. Cl.
*G06F 11/34* (2006.01)
*G06F 11/30* (2006.01)
*G06F 9/48* (2006.01)

(52) U.S. Cl.
CPC ........ *G06F 11/3409* (2013.01); *G06F 9/4806* (2013.01); *G06F 9/4887* (2013.01); *G06F 11/3006* (2013.01)

(58) Field of Classification Search
CPC . G06F 11/3409; G06F 9/4887; G06F 11/3006
See application file for complete search history.

(56) References Cited

U.S. PATENT DOCUMENTS

| 5,257,381 | A  | 10/1993 | Cook |
| 5,636,376 | A  | 6/1997  | Chang |
| 5,949,415 | A  | 9/1999  | Lin et al. |
| 6,895,285 | B2 | 5/2005  | Maity |
| 6,978,303 | B1 | 12/2005 | McCreesh et al. |

(Continued)

FOREIGN PATENT DOCUMENTS

| CN | 200990614 Y | 12/2007 |
| JP | 5021886 B2  | 9/2012  |

(Continued)

OTHER PUBLICATIONS

Arunachalam, A., Remote Deployment of Monitoring Agents on Computing Systems, U.S. Appl. No. 16/943,360, filed Jul. 30, 2020, 43 pages.

*Primary Examiner* — Benjamin C Wu

(57) ABSTRACT

User input is obtained at a central monitoring device to deploy a monitoring agent at a host computing node. Based on the user input, a job is identified to be executed by a deployment server to deploy the monitoring agent at the host computing node. An execution time window is identified to execute the job at the host computing node. The deployment server is accessed using a service account that does not require human intervention and the execution of the job is triggered within the execution time window to cause the deployment server to deploy the monitoring agent at the host computing node.

17 Claims, 3 Drawing Sheets

(56) References Cited

U.S. PATENT DOCUMENTS

| | | | |
|---|---|---|---|
| 7,246,156 B2 | 7/2007 | Ginter et al. | |
| 7,299,455 B2 | 11/2007 | Anderson et al. | |
| 7,580,996 B1 | 8/2009 | Allan et al. | |
| 7,685,272 B2 | 3/2010 | Bansod et al. | |
| 7,734,777 B2 | 6/2010 | Raja et al. | |
| 7,865,888 B1 | 1/2011 | Qureshi et al. | |
| 7,873,877 B2 | 1/2011 | Rowles et al. | |
| 8,046,443 B2 | 10/2011 | Parker et al. | |
| 8,175,862 B1 | 5/2012 | Bourlatchkov et al. | |
| 8,572,244 B2 | 10/2013 | Campagnoni | |
| 8,677,346 B1 | 3/2014 | Griffin et al. | |
| 8,819,701 B2 | 8/2014 | Wheeler et al. | |
| 8,909,761 B2 | 12/2014 | Reynolds et al. | |
| 9,253,214 B1 | 2/2016 | Pillai et al. | |
| 9,577,892 B2 | 2/2017 | Chaudhary et al. | |
| 9,645,835 B2 | 5/2017 | Phillips et al. | |
| 10,042,628 B2 | 8/2018 | OlmstedThompson | |
| 10,282,225 B2 | 5/2019 | Vincent | |
| 10,284,600 B2 | 5/2019 | Beckman et al. | |
| 10,462,002 B2 | 10/2019 | Deklich et al. | |
| 10,565,007 B2 | 2/2020 | Aggarwal | |
| 11,188,437 B1 * | 11/2021 | Arunachalam | G06F 11/3409 |
| 11,204,756 B1 * | 12/2021 | Samuel | G06F 8/65 |
| 2002/0147974 A1 | 10/2002 | Wookey | |
| 2002/0156877 A1 | 10/2002 | Lu et al. | |
| 2004/0078682 A1 | 4/2004 | Huang | |
| 2004/0162781 A1 | 8/2004 | Searl et al. | |
| 2004/0181794 A1 | 9/2004 | Coleman et al. | |
| 2004/0230530 A1 | 11/2004 | Searl et al. | |
| 2005/0005200 A1 | 1/2005 | Matena et al. | |
| 2005/0289538 A1 | 12/2005 | Black-Ziegelbein et al. | |
| 2006/0173856 A1 | 8/2006 | Jackson et al. | |
| 2006/0173895 A1 | 8/2006 | Engquist et al. | |
| 2007/0168919 A1 | 7/2007 | Henseler et al. | |
| 2007/0198664 A1 | 8/2007 | Satkunanathan et al. | |
| 2008/0141240 A1 | 6/2008 | Uthe | |
| 2008/0168477 A1 | 7/2008 | Flegg et al. | |
| 2009/0043890 A1 | 2/2009 | Noonan, III | |
| 2010/0281456 A1 | 11/2010 | Eizenman et al. | |
| 2010/0318836 A1 * | 12/2010 | Ness | G06F 11/0709 714/2 |
| 2012/0084413 A1 | 4/2012 | Pasternak | |
| 2012/0102484 A1 | 4/2012 | Hopmann et al. | |
| 2013/0036218 A1 | 2/2013 | Campagnoni | |
| 2013/0080641 A1 | 3/2013 | Lui et al. | |
| 2013/0204948 A1 * | 8/2013 | Zeyliger | G06F 9/44505 709/221 |
| 2014/0047084 A1 | 2/2014 | Breternitz et al. | |
| 2015/0040127 A1 | 2/2015 | Dippenaar et al. | |
| 2015/0052534 A1 * | 2/2015 | Wang | G06F 9/46 718/102 |
| 2015/0378763 A1 | 12/2015 | Hassine et al. | |
| 2017/0004018 A1 | 1/2017 | Mangtani et al. | |
| 2017/0353541 A1 | 12/2017 | Higashi | |
| 2018/0131579 A1 | 5/2018 | Jacobs et al. | |
| 2018/0332110 A1 | 11/2018 | Brandwine et al. | |
| 2020/0151023 A1 * | 5/2020 | Bai | H04L 41/0893 |

FOREIGN PATENT DOCUMENTS

| | | |
|---|---|---|
| JP | 2015164067 A | 9/2015 |
| WO | 2012000999 A1 | 1/2012 |

* cited by examiner

REMOTE DEPLOYMENT OF MONITORING AGENTS ON COMPUTING SYSTEMS

CROSS-REFERENCE TO RELATED APPLICATIONS

This application is a continuation of U.S. patent application Ser. No. 16/943,360 filed Jul. 30, 2020, by Annamalai Arunachalam, and entitled "REMOTE DEPLOYMENT OF MONITORING AGENTS ON COMPUTING SYSTEMS," which is incorporated herein by reference.

TECHNICAL FIELD

The present disclosure relates generally to monitoring computing systems, and more specifically to remote deployment of monitoring agents on computing systems.

BACKGROUND

In large enterprises, monitoring performance of computing systems and applications is a formidable task. For example, a large enterprise typically maintains a distributed enterprise network including multiple clusters of computing nodes spread over a large geographical region which makes the network difficult to monitor. Existing monitoring solutions do not provide an efficient method to deploy monitoring agents across host computing nodes of the enterprise network and collect log data from the host computing nodes. Traditional methods for deploying monitoring agents at host computing nodes are complicated and prone to errors.

SUMMARY

The system and methods implemented by the system as disclosed in the present disclosure provide technical solutions to the technical problems faced by current technology by, among other things, efficiently and consistently deploying monitoring agents across host computing nodes with a high degree of accuracy. The disclosed system and methods provide several practical applications and technical advantages.

A central monitoring device (e.g., a central monitoring server) is provided that is operatively coupled to a deployment server, wherein the deployment server is configured to deploy a set of monitoring agents at the plurality of host computing nodes. A user may use a front-end client device connected with the central monitoring device to specify input parameters for deploying a monitoring agent at a host computing node. The input parameters may include an identity of a user requesting the deployment, an identity of the host computing node, an indication of the monitoring agent and an indication that the monitoring agent is to be deployed at the host computing node. A monitoring manager at the central client device is configured to carry out the requested deployment based on the user input obtained from the user. For example, based on the user input obtained from front end client device, the monitoring agent selects an appropriate deployment job that can be executed to carry out the requested deployment. The monitoring manager further identifies an execution time window within which the deployment job can be executed at the host computing node. The monitoring manager then accesses the deployment server using a service account that does not require human intervention and triggers execution of the deployment job at the deployment server within the execution time window to cause the deployment server to deploy the monitoring agent at the host computing node.

The above method for deployment of a monitoring agent at a host computing node allows deployment of monitoring agents across host computing nodes with a high degree of consistency, accuracy and speed. The disclosed system and methods accept a limited set of input parameters from the user and automatically determine a remaining set of input parameters needed to deploy a monitoring agent at a host computing node. For example, the user only needs to provide an identity of the monitoring agent and the identity of the host computing node at which the specified monitoring agent is to be deployed. Based on these very limited user input, the monitoring manager determines a custom deployment job to be used for the deployment, a job path where the deployment job can be accessed, an execution time window related to the specified host computing node, an estimated time for completion of the deployment, a service account to use for the deployment etc. By automatically determining several input parameters to use for the deployment, the disclosed system and methods allow for deployment of monitoring agents with relative ease and at the same time maintain high degrees of accuracy. The disclosed methods significantly reduce user effort and allow for an easy and uncomplicated user interface at the front-end client device. Further, the system and methods include a mechanism for detecting unsuccessful deployment attempts and automatically re-triggering the deployment, thus ensuring that a monitoring agent is properly deployed at a host computing node.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
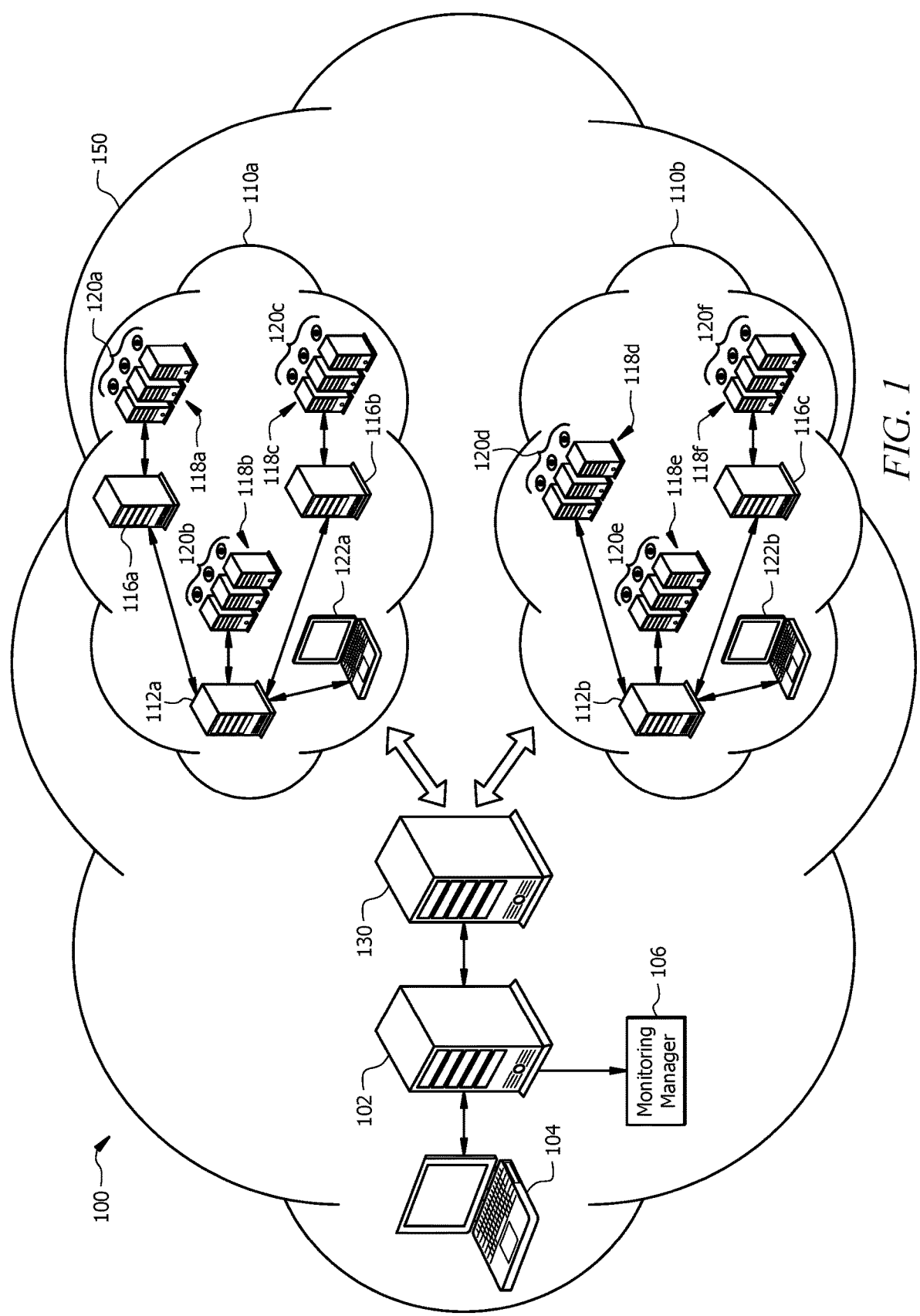
FIG. 1 is a schematic diagram of a monitoring system for monitoring performance and availability of systems and applications in an enterprise network, in accordance with certain embodiments of the present disclosure.

FIG. 1 is a schematic diagram of a monitoring system 100 for monitoring performance and availability of systems and applications in an enterprise network, in accordance with certain embodiments of the present disclosure.
Monitoring Infrastructures As shown, the monitoring system 100 includes a plurality of monitoring infrastructures 110. A large enterprise typically maintains a distributed enterprise network including multiple clusters of computing nodes. For example, the enterprise network may be divided by regions (e.g., continent, country, province, state, city, etc.), wherein each region is associated with a regional cluster of computing nodes of the enterprise network. A monitoring system (e.g., monitoring system 100) designed to monitor performance and availability of systems and applications within the enterprise network may be divided into several monitoring infrastructures, wherein each monitoring infrastructure is responsible to monitor parameters related to a particular cluster of computing nodes of the enterprise network. FIG. 1 shows two such monitoring infrastructures 110a and 110b as part of the monitoring system 100. In an embodiment, each of the monitoring infrastructures 110a and 110b is configured to monitor parameters for a different regional cluster of computing nodes of an enterprise network. For example, as shown in FIG. 1, monitoring infrastructure 110a is configured to monitor parameters related to computing nodes 118a-c. Similarly, monitoring infrastructure 110b is configured to monitor parameters related to computing nodes 118d-f. The parameters that may be monitored by the monitoring system 100 may include CPU (central processing unit) metrics, disk space metrics, invalid login attempts and other parameters that indicate availability and/or performance of a system or application within an enterprise network.

While FIG. 1 shows two monitoring infrastructures, a skilled person may appreciate that the monitoring system 100 may include less than two or more than two monitoring infrastructures depending on a size and architecture of the enterprise network the monitoring system 100 is designed to monitor.

Each of the monitoring infrastructures 110 is based on a server-client-agent architecture following a hub-spoke model. Monitoring agents 120 are installed at computing nodes 118 of an enterprise network. A computing node 118 may also be referred to as a host computing node or simply a host node as it hosts the monitoring agent 120 that is configured to monitor the computing node 118. The terms computing node, host computing node and host node are used interchangeably throughout this disclosure. As shown in FIG. 1, monitoring agents 120a-f monitor computing nodes 118a-f respectively. In an embodiment, one or more monitoring agents 120 may be configured to monitor each computing node 118. For example, the monitoring agents 120 may include OS (Operating System) monitoring agent, log monitoring agent, script monitoring agent, SNMP (Simple Network Management Protocol agent) and the like. The monitoring agents 120 collect data from monitored computing nodes 118 and report the collected data to a monitoring server 112 or 116. In an embodiment, a monitoring agent 120 interacts with a single operating system or application and in most cases is located at the same computing node 118 where the operating system or application is running. A monitoring agent 120 may be an OS agent or a non-OS agent. OS agents may monitor the availability and performance of computing nodes 118 (e.g., Windows server), while non-OS agents may monitor the availability and performance of applications installed at the computing nodes 118. In an embodiment, a monitoring agent 120 is a software application implemented by at least one processor at the respective host computing node 118 hosting the monitoring agent 120.

A monitoring agent 120 monitors an operating system or application at a computing node 118 based on a monitoring configuration. A monitoring configuration is a set of definitions or conditions or events to test and may be used to raise alerts of the conditions and to trigger single action commands or automated workflows. A monitoring configuration may be configured to detect when specific conditions or events (e.g., slow transaction rates or invalid logon attempts) in an infrastructure occur, and in response, raise an alert.

Each monitoring configuration may be assigned to one or more operating systems or applications that is to be monitored for specific events. An event monitored by a monitoring configuration may be pure or sampled. When the determination of an event is based on observations made at specific intervals, the event may be referred to as a sampled event. When an event is based on a spontaneous occurrence, the event may be referred to as a pure event. Thus, a definition for a sampled event generally includes an interval at which observations for the event are made. Definitions for pure events are not associated with intervals. An example of a sampled event is disk free space <10%. The sample event becomes true when the available disk space falls below 10% and later becomes false again after unwanted files are deleted and the disk space goes to 11% or higher. An example of a pure event is an event that monitors for an invalid user logon attempt. The event occurs when an invalid logon attempt is detected and is set to true. This event does not become a false once set to true. In order to monitor an operating system or application, a respective monitoring agent 120 may use a pre-defined monitoring configuration or a custom monitoring configuration specifically created for the operating system or application being monitored.

As shown in FIG. 1, each monitoring infrastructure 110 includes a plurality of monitoring servers 112 and 116 which act as a collection and control points for performance and availability data and alerts received from monitoring agents 120. For example, in monitoring infrastructure 110a, monitoring agents 120a (monitoring computing nodes 118a) report performance and availability data to monitoring server 116a, monitoring agents 120b (monitoring computing nodes 118b) report data to monitoring server 112a and monitoring agents 120c (monitoring computing nodes 1118c) report data to monitoring server 116b. Similarly, in monitoring infrastructure 110b, monitoring agents 120d (monitoring computing nodes 118d) and monitoring agents 120e (monitoring computing nodes 118e) report performance and availability data to monitoring server 112b, and monitoring agents 120f (monitoring computing nodes 118f) report data to monitoring server 116c.

Each monitoring server 112 or 116 is also responsible for tracking the online or offline status of monitoring agents 120 reporting data to the monitoring server 112 or 116. Because of the number of functions a monitoring server 112 or 116 performs, large-scale enterprise networks usually include multiple monitoring servers to distribute the load, as shown in FIG. 1. In an embodiment, one of the monitoring servers in each monitoring infrastructure 110 is designated as the hub monitoring server, and the remaining monitoring servers are termed remote monitoring servers which report their data to the hub monitoring server. For example, in monitoring infrastructure 110a, monitoring server 112a is a hub monitoring server and monitoring servers 116a and 116b are remote monitoring servers. Similarly, in monitoring infrastructure 110b, monitoring server 112b is a hub monitoring server and monitoring server 116c is a remote monitoring server.

Each monitoring server 112 or 116 is located on its own computer and has a unique monitoring server name. The architectures of various remote monitoring servers 116 may differ from each other and from the hub monitoring server 112. For example, a remote monitoring server 116 running on UNIX may report to a hub monitoring server running on Windows.

A user may access data from a monitoring server 112 or 116 using a portal client 122. As shown, monitoring infrastructure 110a includes a portal client 122a connected to the hub monitoring server 112*a*. Similarly, monitoring infrastructure 110*b* includes a portal client 122*b* connected to the hub monitoring server 112*b*. An optional portal server (not shown) may provide presentation and communication services for each portal client 122. The portal server may provide the core presentation layer for retrieval, manipulation, analysis, and pre-formatting of data. The portal server may retrieve data from the hub monitoring server 112 in response to user actions at the portal client 122 and send the data back to the portal client 122 for presentation. The portal server may also provide presentation information to the portal client 122 so that the portal client 122 can render the user interface views suitably. In an embodiment, the services of portal server may be integrated into the hub monitoring server 112, and the hub monitoring server 112 may be configured to provide presentation and communication services for each portal client 122.

While FIG. 1 shows the portal clients 122 connected to the hub monitoring servers 112, a skilled person may appreciate that one or more of the remote monitoring servers 116 may have their own respective portal clients which may be used to access data from the one or more remote monitoring servers 116.

In certain embodiments, the monitoring infrastructures 110 may not have the ability to install monitoring agents 120 at the respective host computing nodes 118. In such a case, a separate deployment server may be used to deploy the monitoring agents 120 at the host computing nodes. For example, as shown in FIG. 1, the monitoring system 100 further includes a deployment server 130 configured to deploy monitoring agents 120 at respective host computing nodes 118. The deployment server 130 is further configured to collect log data recorded during deployment of a monitoring agent 120. The log data may include results of deploying one or more monitoring agents 120 at a host computing node 118. Deploying a monitoring agent 120 at a host computing node 118 includes installing the monitoring agent 120 at the host computing node 118. The deployment server 130 may belong to any third-party service provider which provides monitoring agent deployment services. The methods employed by the deployment server 130 to install the monitoring agents 120 and collect log data is beyond the scope of this disclosure and will not be described in further detail.

Central Monitoring Server and Central Client Device

As shown in FIG. 1, the monitoring system 100 also includes a central monitoring server 102 which is configured to manage a plurality of monitoring infrastructures such as monitoring infrastructures 110*a* and 110*b*. A central client device 104 may provide a front-end user interface which may be used by a user to provide input parameters and trigger one or more jobs related to the monitoring infrastructures 110. A job in computing terminology generally refers to a process including a set of steps to accomplish a computing task such as deploying a monitoring agent 120 at a host computing node 118 or retrieving log data from a monitoring agent 120. Additionally, data retrieved from the monitoring infrastructures (e.g., log data) may be presented to the user using the front-end interface of the central client device 104. In an embodiment, the front-end interface may be a web application implemented using any conventional technology such as Java Server Pages (JSP). In an embodiment, the central monitoring server 102 may be any conventional webserver that can handle HTTP (Hypertext Transfer Protocol) request and response such as an Apache Tomcat Webserver. Further, the central monitoring server 102 may be a Linux or Windows based server.

In an embodiment, the front-end interface may be representative of a component of a client-server application (or other distributed application) which can communicate with the server 102 over the network 150. For example, the front-end interface may be a "thin" client where the processing is largely directed by the front-end application but performed by the server 102.

The central monitoring server 102 may include a monitoring manager 106 configured to manage the monitoring infrastructures 110. In certain embodiments, the monitoring manager 106 may be configured to manage deployment of monitoring agents 120 at the host computing nodes 118. For example, the monitoring manager 106 may trigger execution of a deployment job at the deployment server 130 based on user input parameters obtained from the front-end interface of the central client device 104 and may cause the deployment server 130 to deploy a specified monitoring agent 120 at one or more specified host computing nodes 118.

The user may initiate deployment of a monitoring agent 120 using the front-end interface of the central client device 104 by providing one or more input parameters to be used for the deployment. The input parameters may include one or more of an identity (ID) of the user, an indication of the monitoring agent 120 to be deployed, and identities of one or more host computing nodes 118 at which the indicated monitoring agent 120 is to be deployed. The monitoring manager 106 may be configured to perform a number of tasks related to monitoring agents 120 including deployment of monitoring agents, restarting monitoring agents 120 and collecting log data from monitoring agents 120. In this context, the user input parameters provided by the user at the front-end interface of the central client device 104 may additionally include a type of task to be performed (e.g., deploy monitoring agent, restart monitoring agent, collect log data from a monitoring agent etc.) in relation to the indicated monitoring agent 120.

The user may either type the input parameters in respective text fields provided at the front-end interface or may select each value of the input parameter from a respective list of values for the parameter. For example, the user may select the type of task to be performed from a list of available tasks that may be performed in relation to a monitoring agent. The list of tasks may include deploying a monitoring agent, restarting a monitoring agent and collecting log data from a monitoring agent. Similarly, the user may select the identity of the monitoring agent 120 from a list of available monitoring agents 120 and may select the identities of the host computing nodes 118 from a list of host computing nodes 118. For example, the list of monitoring to agents 120 may include OS (Operating System) monitoring agent, log monitoring agent, script monitoring agent, SNMP (Simple Network Management Protocol agent) and the like. The list of host computing nodes 118 may include a list of all host computing nodes (or a subset thereof) in the monitoring infrastructures 110*a* and 110*b*.

In an embodiment, the front-end application at the central client device 104 or the monitoring manager 106 may check for errors in the user provided input. For example, the user inputs may be checked for typographical errors, format errors (e.g. format of the host computing node identities or monitoring agent identities) and the like, and the user may be notified of any identified errors in the user inputs or the errors may be corrected automatically.

After providing information relating to identity (ID) of the user, an indication of the monitoring agent 120 to be deployed and identities of one or more host computing nodes 118 at which the indicated monitoring agent 120 is to be deployed, the user may trigger the deployment of the identified monitoring agent 120 from the central client device 104, for example, by selecting a button on a user interface screen of the front-end application.

Once the deployment of the monitoring agent 120 is triggered at the central client device 104, the monitoring manager 106 generates a unique trace log file to record information relating to the deployment. For example, the monitoring manager 106 may record the user ID of the user triggering the deployment, a unique job ID of a job executed for carrying out the deployment, a time of triggering the deployment by the user, and the user input parameters specified for the deployment. The monitoring manager 106 records in the trace log file every transaction during the deployment starting from obtaining user input at the central client device 104 to completing deployment of the monitoring agent 120 at the respective one or more host computing nodes 118.

The monitoring manager 106 may be configured to validate an access level of the user that triggered a task (e.g., deployment of monitoring agent 120) and checks whether the user is authorized to perform the task based on the user's level of access. Three different levels of access may be defined to provide proper authorization to users. Users with an engineering level access may execute jobs at development computing nodes only. Users with operations level access may execute jobs at development as well as production computing nodes. Users with no access may not execute any jobs. The monitoring manager 106 allows a job to be executed only if the user triggering the job has the appropriate level of access to execute the job on the specified one or more host computing nodes 118. In an embodiment, a user access matrix is stored at the central monitoring server 102 which includes a list of registered user IDs and a respective level of access associated with each user ID. The monitoring manager 106 searches the user access matrix based on the user ID specified by the user and determines the user's level of access from the access matrix.

The monitoring manger 106 may be configured to identify a type of each host computing node 118 based on the identity of the host computing node provided by the user as part of user input. For example, a host computing node 118 may be a production node or a non-production node such as a development node or a test node. The central monitoring server 102 stores an inventory of host computing nodes 118 in the monitoring infrastructures 110*a* and 110*b*, and further stores information relating to the type of each computing node 118 (e.g., whether each host computing node 118 is a production server or a non-production server). The monitoring manager 106 may query the inventory based on the identities of the host computing node 118 specified by the user as part of user input to determine the type of each specified host computing node 118.

The monitoring manager 106 may be configured to determine whether the user is authorized to perform the requested task (e.g., deployment of a monitoring agent 120) based on the user's level of access (e.g., determined based on the user matrix) and the type of the specified one or more host computing nodes (e.g., determined based on the inventory of host computing nodes). For example, if a specified host computing node 118 is determined to be a production node (e.g., based on the inventory) and the user's level of access (e.g., based on the user matrix) includes deployment access on production nodes, the monitoring manager 106 determines that the user has authorization for performing the deployment of the specified monitoring agent 120 at the specified host computing node 118.

The monitoring manager 106 may be configured to identify based on the user input an appropriate job which can be executed to carry out a requested task (e.g., deployment of a specified monitoring agent 120, collection of log etc.) at a specified host computing node 118. As described above, a job in computing terminology generally refers to a process including a set of steps to accomplish a computing task such as deploying a monitoring agent 120 at a host computing node 118 or retrieving log data from a monitoring agent 120. The identified job may be custom for the specified task (e.g., deployment, collection of log data etc.), the specified host computing node (e.g., custom for production or non-production node) and for the specified type of monitoring agent 120. The monitoring manager 106 may identify an appropriate job to be executed based on one or more of the specified type of task to be performed (e.g., deploy, collect log data etc.), the specified monitoring agent 120 and the specified host computing node 118. For example, when a user triggers a deployment of a Linux monitoring agent at a host computing node 118 that is a production node, the monitoring manager 106 selects a job designed to deploy a Linux monitoring agent at production nodes. The central monitoring server 102 may store a list of jobs, wherein each job is custom designed for a set of parameters including one or more of the type of requested task, the type of monitoring agent 120, the service role to be used for the task (described below) and the host computing node 120 at which the task is to be performed. Each job is identified by a unique job ID. The monitoring manager 106 may select a job from the list of jobs based on the user input parameters. In an embodiment, each job is associated with one or more software programs (e.g., a shell script), wherein the software program includes software code to perform the set of steps to perform the task for which the job is designed. A job may be executed by executing the one or more software programs.

The monitoring manager 106 is configured to determine a job path for accessing the job selected for carrying out the requested task. For example, the job path may point to a location in the monitoring system 100 where the job and associated one or more software programs are stored. A job and associated one or more software programs may be stored at the central monitoring server 102, the deployment server 130, monitoring servers 112 or 116 or anywhere in the monitoring system 100.

The monitoring manager 106 may be configured to determine an execution time window associated with each specified host computing node 118. The execution time window associated with a host computing node 118 may be a time interval within which jobs are allowed to be executed at the host computing node 118. For example, the execution time window may be set for a host computing node 118 during periods of relative inactivity (e.g., time periods with lower usage of processing resources) such as non-business hours. The central monitoring server 102 may store the execution time windows configured for each host computing node in the inventory of host computing nodes 118. The monitoring manager 106 may query the inventory based on the identities of the host computing node 118 specified by the user to determine the respective execution time windows. Additionally or alternatively, the monitoring manager may query a specified host computing node 118 and receive information related to the execution time window directly from the host computing node 118. Once the execution time window of a specified host computing node 118 is identified, the monitoring manager 106 then configured to determine a time of execution within the execution time window of the host computing node 118. The time of execution may relate to the time at which the monitoring manager 106 is to trigger execution of the identified job at the deployment server 130. The monitoring manager 106 may set the time of execution at any time within the execution time window, for example, at the start of the execution time window or anytime during the execution time window.

In an embodiment, the monitoring manager 106 determines a geographic location (e.g., region, country, state, city, province, etc.) of a specified host computing node 120 and determines the local time zone at the determined geographic location. The inventory of the host computing nodes 118 maintained at the central monitoring server 102 may further include geographical locations of the host computing nodes 118. The monitoring manager may query the inventory based on identities of the host computing nodes 118 specified by the user to determine the respective geographical regions of the nodes. Once the time zone associated with a specified host computing node 118 is identified, the monitoring manager 106 may convert the execution time window of the host computing node 118 to the time zone of the central monitoring server 102. In an embodiment, the monitoring manager determines the time of execution in accordance with the time zone of the central monitoring server 102.

The monitoring manager 106 may be configured to determine an estimated time for completion of a requested task such as deployment of a specified monitoring agent 120 at a specified host computing node 118. The monitoring manager 106 may determine the estimated time for completion of the deployment based on historical data related to deploying the same or similar monitoring agent 120 at one or more host computing nodes 118 having similar configuration and/or capabilities as the specified host computing node 118. For example, the historical data may include time taken to deploy the same or similar monitoring agent 120 at one or more similar host computing nodes 118, time taken to communicate a copy of the monitoring agent 120 to the specified host computing node 118 and a processing latency associated with the specified host computing node 118.

The monitoring manager 106 may be configured to compare the estimated time for completion of the requested task (deployment of a specified monitoring agent 120) at the specified host computing node 118 with the length of the execution time window associated with the host computing node 118 and determine whether the length of the execution time window is sufficiently long to complete the task. If the length of the execution time window is not sufficiently long to complete the task, the monitoring manager 106 generates an error for display to the user at the central client device 104.

The monitoring manager 106 is configured to identify a service role to be used to execute an identified job based on the type of task to be completed. For example, the service role may include a deployment service role for deployment of a monitoring agent 120 or a discovery service role for collecting log data from a monitoring agent 120. A service role may define an extent of authorization, for example, to access deployment directories and limits access to only those systems and data required to complete the specified task. The monitoring manager 106 is configured to select a service account for the specified task based on the identified service role. A service account does not require human intervention may be used to access the deployment server 130 and to establish connection with the deployment server 130.

The monitoring manager 106 is configured to generate an input file (e.g., an input text file) including information relating to one or more user input parameters and one or more additional input parameters generated based on the user input parameters. The input file may include information relating to one or more of the identity of the job selected for performing a specified task (e.g., deploying agent, collecting log data etc.), the job path for accessing the job, identities of one or more host computing nodes 118 where the specified task is to be executed, the identity of the monitoring agent 120, the execution time window associated with each specified host computing node 118, the time of execution, the geographic location of each specified host computing node 120, the estimated time for completion of the specified task, the service role to be used for the executing the job and other additional input parameters specified by the user. In one example, the generated input file includes information relating to the identity of the job selected for performing a specified task (e.g., deploying monitoring agent, collecting log data etc.), the job path for accessing the job, identities of one or more host computing nodes 118 where the specified task is to be executed, the estimated time for completion of the specified task and the service role to be used for executing the job at the deployment server 130.

Once all error checks and validations are completed and required input parameters for completing the requested task are obtained or determined, the monitoring manager 106 is configured to access the deployment server 130 using the selecting service account that does not require human intervention and has the appropriate level of access to execute the selected job. Accessing the deployment server 130 may include automatically logging into the deployment server 130 using the service account. Upon successfully accessing the deployment server 130, the monitoring manager 106 establishes a connection with the deployment server 130 and triggers execution of the selected job based on the user input parameters to cause the deployment server 130 to perform the task requested by the user. For example, once a connection is established between the central monitoring server 102 and the deployment server 130, the monitoring manager 106 transfers a copy of the generated input file to the deployment server 130 and triggers execution of the selected job at the deployment server 130 based on the input parameters specified in the input file. For example, when the user specified task is to deploy a specified monitoring agent 120 at a specified host computing node 118, the monitoring manager 106 triggers execution of a selected deployment job at the deployment server 130 at the determined time of execution. Triggering execution of the deployment job causes the deployment server to extract input parameters from the input file (e.g., including the identity of the job, job path, target host computing node 118, service role etc.) and carry out the deployment task based on the extracted input parameters. For example, triggering the execution of the job causes the deployment server 130 to access the job using the specified job path and execute the job to install the specified monitoring agent 120 at the specified host computing node 118 using the specified service role.

After triggering the execution of the selected job at the deployment server 130, the monitoring manager 106 may be configured to wait for a time period that equals or exceeds the estimated time for completion of the requested task and re-access the deployment server 130 using the service account and re-establish a connection between the central monitoring server 102 and the deployment server 130. Once the connection with the deployment server 130 is re-established, the monitoring manager retrieves results of the execution and presents the results to the user using the front-end interface at the central client device 104. In an embodiment, the deployment server 130 generates a unique identification each time a job is executed at the deployment server 130, wherein each identification uniquely identifies a corresponding execution of a job. The monitoring manager 106 obtains the unique identification of the execution of the selected job from the deployment server 130 and requests the results of the execution after re-establishing the connection based on the obtained identification.

The monitoring manager 106 may be configured to examine the results of the execution obtained from the deployment server 130 and re-trigger the execution of the job at the next execution window if the execution was unsuccessful. The method for re-triggering the execution of the job is similar to the initial triggering of the execution of the job described above.

As shown in FIG. 1 all components of the monitoring system 100 may be connected to a network 150 and may communicate with each other over the network 150. The network 150, in general, may be a wide area network (WAN), personal area network (PAN), a cellular network, or any other technology that allows devices to communicate electronically with other devices. In one or more embodiments, the network 150 may be the internet.

Each of the computing nodes 118 may include a computing device running one or more software applications. For example, a computing node 118 may be representative of a computing system hosting software applications that may be installed and run locally or may be used to access software applications running on a server. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices.

Figure 2:
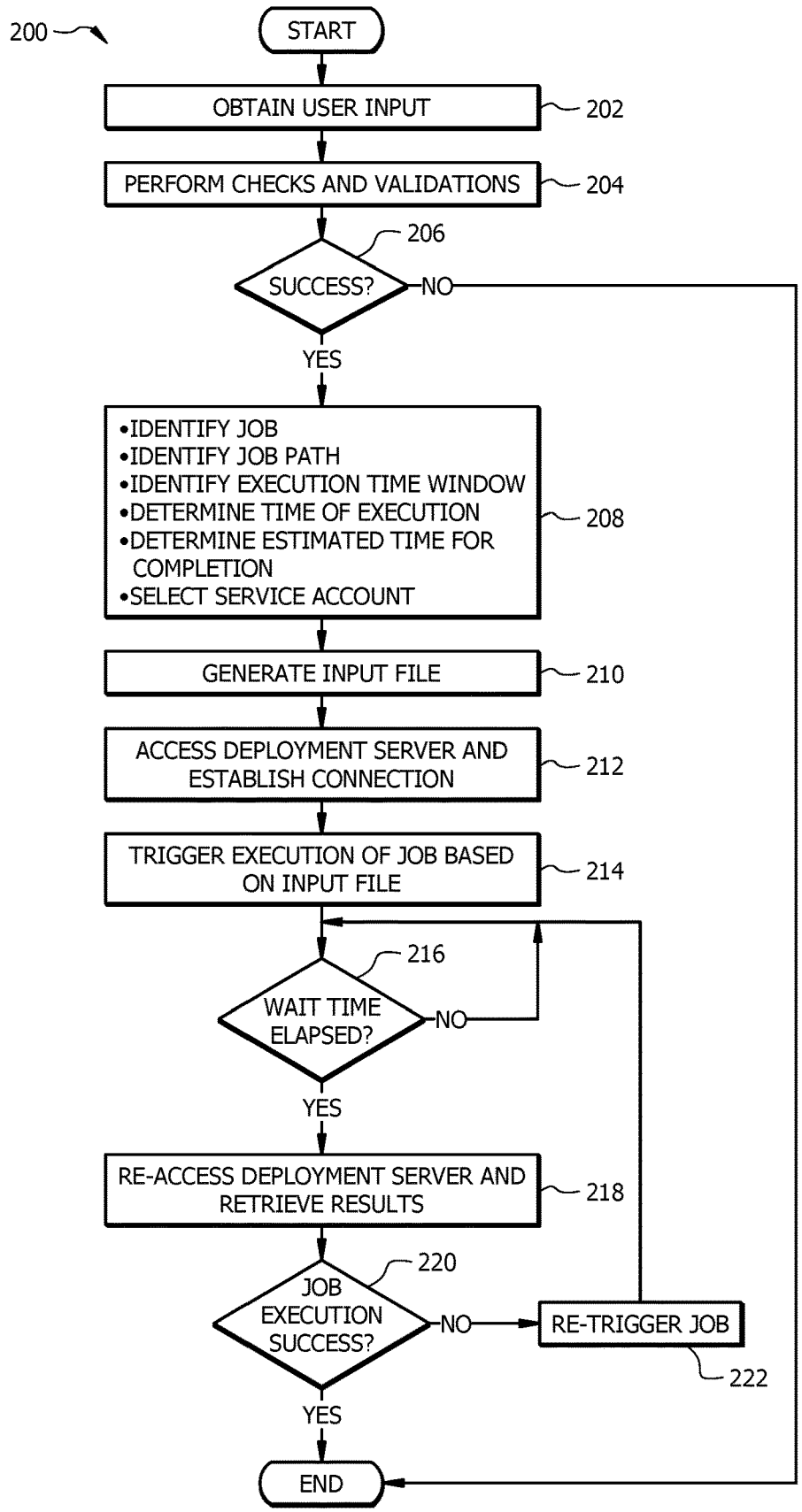
FIG. 2 illustrates a flowchart of an example method for deploying a monitoring agent at a host computing node, in accordance with certain embodiments of the present to disclosure.

FIG. 2 illustrates a flowchart of an example method 200 for deploying a monitoring agent (e.g., monitoring agent 120) at a host computing node (e.g., host computing node 118), in accordance with certain embodiments of the present disclosure. In an embodiment the method 200 may be performed by the monitoring manager 106 of the central monitoring server 102 shown in FIG. 1.

At step 202, the monitoring manager 106 obtains user input parameters from the front-end user interface at the central client device 104. The user may initiate deployment of a monitoring agent 120 using the front-end interface of the central client device 104 by providing one or more input parameters to be used for the deployment. The input parameters may include one or more of an identity (ID) of the user, an indication of the monitoring agent 120 to be deployed, and identities of one or more host computing nodes 118 at which the indicated monitoring agent 120 is to be deployed. The user may either type the input parameters in respective text fields provided at the front-end interface or may select each value of the input parameter from a respective list of values for the parameter. For example, the user may select the type of task to be performed from a list of available tasks that may be performed in relation to a monitoring agent. The list of tasks may include deploying a monitoring agent, restarting a monitoring agent and collecting log data from a monitoring agent. Similarly, the user may select the identity of the monitoring agent 120 from a list of available monitoring agents 120 and may select the identities of the host computing nodes 118 from a list of host computing nodes 118. For example, the list of monitoring agents 120 may include OS (Operating System) monitoring agent, log monitoring agent, script monitoring agent, SNMP (Simple Network Management Protocol agent) and the like. The list of host computing nodes 118 may include a list of all host computing nodes (or a subset thereof) in the monitoring infrastructures 110*a* and 110*b*.

After providing information relating to identity (ID) of the user, an indication of the monitoring agent 120 to be deployed and identities of one or more host computing nodes 118 at which the indicated monitoring agent 120 is to be deployed, the user may trigger the deployment of the identified monitoring agent 120 from the central client device 104, for example, by selecting a button on a user interface screen of the front-end application.

In an embodiment, the front-end interface may be a web application implemented using any conventional technology such as Java Server Pages (JSP). In an embodiment, the central monitoring server 102 may be any conventional webserver that can handle HTTP (Hypertext Transfer Protocol) request and response such as an Apache Tomcat Webserver. Further, the central monitoring server 102 may be a Linux or Windows based server.

At step 204, the monitoring manager performs a number of checks and validations based on the obtained user input parameters. For example, once the deployment of the monitoring agent 120 is triggered by the user at the central client device 104, the monitoring manager 106 validates an access level of the user and checks whether the user is authorized to perform the task based on the user's level of access. Three different levels of access may be defined to provide proper authorization to users. Users with an engineering level access may execute jobs at development computing nodes only. Users with operations level access may execute jobs at development as well as production computing nodes. Users with no access may not execute any jobs. The monitoring manager 106 allows a job to be executed only if the user triggering the job has the appropriate level of access to execute the job on the specified one or more host computing nodes 118. In an embodiment, a user access matrix is stored at the central monitoring server 102 which includes a list of registered user IDs and a respective level of access associated with each user ID. The monitoring manager 106 searches the user access matrix based on the user ID specified by the user and determines the user's level of access from the access matrix.

The monitoring manger 106 further identifies a type of each host computing node 118 specified by the user based on the identity of the host computing node provided by the user as part of user input. For example, a host computing node 118 may be a production node or a non-production node such as a development node or a test node. The central monitoring server 102 stores an inventory of host computing nodes 118 in the monitoring infrastructures 110*a* and 110*b*, and further stores information relating to the type of each computing node 118 (e.g., whether each host computing node 118 is a production server or a non-production server). The monitoring manager 106 queries the inventory based on the identities of the host computing node 118 specified by the user as part of user input to determine the type of each specified host computing node 118.

The monitoring manager 106 determines whether the user is authorized to perform the requested deployment of a monitoring agent 120 based on the user's level of access (e.g., determined based on the user matrix) and the type of the specified one or more host computing nodes 118 (e.g., determined based on the inventory of host computing nodes). For example, if a specified host computing node 118 is determined to be a production node (e.g., based on the inventory) and the user's level of access (e.g., based on the user matrix) includes deployment access on production nodes, the monitoring manager 106 determines that the user has authorization for performing the deployment of the specified monitoring agent 120 at the specified host computing node 118.

In an embodiment, the front-end application at the central client device 104 or the monitoring manager 106 may check for errors in the user provided input. For example, the user inputs may be checked for typographical errors, format errors (e.g. format of the host computing node identities or monitoring agent identities) and the like, and the user may be notified of any identified errors in the user inputs or the errors may be corrected automatically.

In an example, once the deployment of the monitoring agent 120 is triggered at the central client device 104, the JSP front-end passes the user input parameters to a Java servlet at the central monitoring server 102. The Java servlet may be managed and run by the monitoring manager 106 at the central monitoring server 102. The servlet performs the various checks and validations described above based on the user input parameters obtained from the JSP front-end.

At step 206, the monitoring manager 106 checks whether the checks and validations described above were successful. If one or more of the above checks and validations are determined to be unsuccessful, the monitoring manager 106 terminates the deployment and the method 200 ends here. On the other hand, if all checks and validations are successful the method 200 proceeds to step 208 where the monitoring manager 106 determines a number of parameters to be used for the requested deployment.

The monitoring manager 106 identifies based on the user input an appropriate job which can be executed to carry out the deployment of the specified monitoring agent 120 at a specified host computing node 118. As described above, a job in computing terminology generally refers to a process including a set of steps to accomplish a computing task such as deploying a monitoring agent 120 at a host computing node 118 or retrieving log data from a monitoring agent 120. The identified job may be custom for deployment of the monitoring agents, the specified host computing node (e.g., custom for production or non-production node) and for the specified type of monitoring agent 120. The monitoring manager 106 may identify an appropriate job to be executed for deployment of the specified monitoring agent 120 at the specified host computing node 118. For example, when a user triggers a deployment of a Linux monitoring agent at a host computing node 118 that is a production node, the monitoring manager 106 selects a job designed to deploy a Linux monitoring agent at production nodes. The central monitoring server 102 may store a list of jobs, wherein each job is custom designed for a set of parameters including one or more of the type of requested task (e.g., deployment of the monitoring agent 120), the type of monitoring agent 120, the service role to be used for the task (described below) and the host computing node 120 at which the task is to be performed. Each job is identified by a unique job ID. The monitoring manager 106 may select a job from the list of jobs based on the user input parameters. In an embodiment, each job is associated with one or more software programs (e.g., a shell script), wherein the software program includes software code to perform the set of steps to perform the task for which the job is designed. A job may be executed by executing the one or more software programs.

The monitoring manager 106 determines a job path for accessing the job selected for carrying out the deployment of the specified monitoring agent 120 at the specified host computing node 118. For example, the job path may point to a location in the monitoring system 100 where the job and associated one or more software programs are stored. A job and associated one or more software programs may be stored at the central monitoring server 102, the deployment server 130, monitoring servers 112 or 116 or anywhere in the monitoring system 100.

The monitoring manager 106 determines an execution time window associated with the specified host computing node 118. The execution time window associated with a host computing node 118 may be a time interval within which jobs are allowed to be executed at the host computing node 118. For example, the execution time window may be set for a host computing node 118 during periods of relative inactivity (e.g., time periods with lower usage of processing resources) such as non-business hours. The central monitoring server 102 may store the execution time windows configured for each host computing node in the inventory of host computing nodes 118. The monitoring manager 106 may query the inventory based on the identities of the host computing node 118 specified by the user to determine the respective execution time windows. Additionally or alternatively, the monitoring manager may query the specified host computing node 118 and receive information related to the execution time window directly from the host computing node 118.

Once the execution time window of the specified host computing node 118 is identified, the monitoring manager 106 then determines a time of execution within the execution time window of the host computing node 118. The time of execution may relate to the time at which the monitoring manager 106 is to trigger execution of the identified job at the deployment server 130. The monitoring manager 106 may set the time of execution at any time within the execution time window, for example, at the start of the execution time window or anytime during the execution time window.

In an embodiment, the monitoring manager 106 determines a geographic location (e.g., region, country, state, city, province, etc.) of the specified host computing node 120 and determines the local time zone at the determined geographic location. The inventory of the host computing nodes 118 maintained at the central monitoring server 102 may further include geographical locations of the host computing nodes 118. The monitoring manager may query the inventory based on the identity of the host computing node 118 specified by the user to determine the respective geographical region of the node. Once the time zone associated with the specified host computing node 118 is identified, the monitoring manager 106 may convert the execution time window of the host computing node 118 to the time zone of the central monitoring server 102. In an embodiment, the monitoring manager determines the time of execution in accordance with the time zone of the central monitoring server 102.

The monitoring manager 106 determines an estimated time for completion of the requested deployment of a specified monitoring agent 120 at a specified host computing node 118. The monitoring manager 106 may determine the estimated time for completion of the deployment based on historical data related to deploying the same or similar monitoring agent 120 at one or more host computing nodes 118 having similar configuration and/or capabilities as the specified host computing node 118. For example, the historical data may include time taken to deploy the same or similar monitoring agent 120 at one or more similar host computing nodes 118, time taken to communicate a copy of the monitoring agent 120 to the specified host computing node 118 and a processing latency associated with the specified host computing node 118.

The monitoring manager 106 may be configured to compare the estimated time for completion of the deployment of the specified monitoring agent 120 at the specified host computing node 118 with the length of the execution time window associated with the host computing node 118 and determine whether the length of the execution time window is sufficiently long to complete the deployment. If the length of the execution time window is not sufficiently long to complete the deployment, the monitoring manager 106 generates an error for display to the user at the central client device 104. In an embodiment the monitoring manager triggers the execution of the deployment job only when the length of the execution time window is sufficiently long to complete the requested deployment.

The monitoring manager 106 identifies a service role to be used to execute the identified job for the deployment. For example, the service role may include a deployment service role for deployment of the monitoring agent 120. A service role may define an extent of authorization, for example, to access deployment directories and limits access to only those systems and data required to complete the specified task. The monitoring manager 106 selects a service account for the specified task based on the identified service role. A service account does not require human intervention may be used to access the deployment server 130 and to establish connection with the deployment server 130.

At step 210, the monitoring manager generates an input file (e.g., an input text file) including information relating to one or more user input parameters and one or more additional input parameters generated based on the user input parameters. The input file may include information relating to one or more of the identity of the job selected for performing the requested deployment, the job path for accessing the job, identity of the host computing node 118 where the deployment is to be executed, the identity of the monitoring agent 120 that is to be deployed at the host computing node 118, the execution time window associated with the specified host computing node 118, the time of execution, the geographic location of each specified host computing node 120, the estimated time for completion of the deployment, the service role to be used for the executing the selected deployment job and other additional input parameters specified by the user. In one example, the generated input file includes information relating to the identity of the job selected for performing the deployment, the job path for accessing the job, identity of the host computing node 118, the estimated time for completion of the deployment and the service role to be used for executing the job at the deployment server 130.

At step 212, the monitoring manager 106 accesses the deployment server 130 and establishes a connection between the central monitoring server 102 and the deployment server 130. As described above, once all error checks and validations are completed and required input parameters for completing the requested task are obtained or determined, the monitoring manager 106 accesses the deployment server 130 using the selecting service account that does not require human intervention and has the appropriate level of access to execute the selected job. Accessing the deployment server 130 may include automatically logging into the deployment server 130 using the service account. Upon successfully accessing the deployment server 130, the monitoring manager 106 establishes a connection with the deployment server 130.

At step 214, the monitoring manager 106 triggers execution of the deployment job at the deployment server based on the input parameters. Upon successfully accessing the deployment server 130 and establishing a connection with the deployment server 130, the monitoring manager 106 triggers execution of the selected deployment job based on the user input parameters to cause the deployment server 130 to perform the deployment requested by the user. For example, once a connection is established between the central monitoring server 102 and the deployment server 130, the monitoring manager 106 transfers a copy of the generated input file to the deployment server 130 and triggers execution of the selected job at the deployment server 130 based on the input parameters specified in the input file. For example, the monitoring manager 106 triggers execution of the selected deployment job at the deployment server 130 at the determined time of execution. Triggering execution of the deployment job causes the deployment server to extract input parameters from the input file (e.g., including the identity of the job, job path, target host computing node 118, service role etc.) and carry out the deployment task based on the extracted input parameters. For example, triggering the execution of the job causes the deployment server 130 to access the job using the specified job path and execute the job to install the specified monitoring agent 120 at the specified host computing node 118 using the specified service role.

At step 216, the monitoring manager checks whether a pre-determined wait time has elapsed after triggering the execution of the deployment job at the deployment server 130. The wait time equals or exceeds the estimated time for completion of the deployment previously determined by the monitoring manager 106. As described above, after triggering the execution of the selected deployment job at the deployment server 130, the monitoring manager 106 waits for a time period that equals or exceeds the estimated time for completion of the deployment task.

Once the wait time has elapsed, the method 200 proceeds to step 218 where the monitoring manager 106 re-accesses the deployment server 130 using the service account and re-establishes a connection between the central monitoring server 102 and the deployment server 130. Once the connection with the deployment server 130 is re-established, the monitoring manager retrieves results of the execution. In an embodiment, the deployment server 130 generates a unique identification each time a job is executed at the deployment server 130, wherein each identification uniquely identifies a corresponding execution of a job. The monitoring manager 106 obtains the unique identification of the execution of the selected job from the deployment server 130 and requests the results of the execution after re-establishing the connection based on the obtained identification.

At step 220, the monitoring manager 106 checks whether the execution of the deployment job was successful based on the obtained results of executing the deployment job by the deployment server 130. If the monitoring manager determines based on the results that the deployment was successful, the method ends here.

However, if the monitoring manager 106 examines the results of the execution obtained and determines that the deployment was unsuccessful, the method proceeds to step 222 where the monitoring manager re-triggers the execution of the job at the next execution window.

In an example, once the Java servlet performs the various checks and validations at step 204, the servlet calls a script program, also managed by the monitoring manager 106, that executes a set of commands to perform steps 206-220 of the method 200. In an embodiment, data related to results of the execution of the deployment job and other error messages may be passed back to the servlet and then to the JSP front-end for presentation to the user on the central client device 104.

Figure 3:
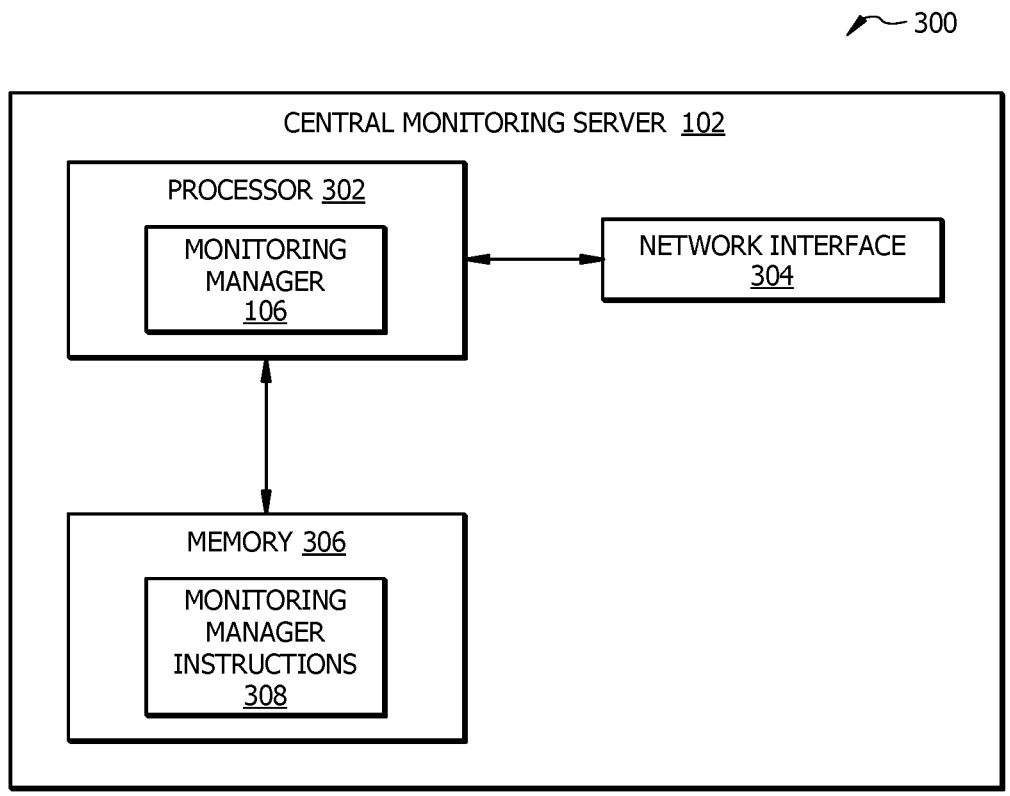
FIG. 3 illustrates an example schematic diagram of a central monitoring server, in accordance with one or more embodiments of the present disclosure.

FIG. 3 illustrates an example schematic diagram of the central monitoring server 102, in accordance with one or more embodiments of the present disclosure.

The central monitoring server 102 comprises a processor 302, a memory 306, and a network interface 304. The central monitoring server 102 may be configured as shown in FIG. 3 or in any other suitable configuration.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (monitoring manager instructions 308) to implement the monitoring manager 106. In this way, processor 302 may be a special-purpose computer designed to implement the functions disclosed herein. In one or more embodiments, the monitoring manager 106 is implemented using logic units, FPGAs, ASICs, DSPs, or any other suitable hardware. The monitoring manager 106 is configured to operate as described with reference to FIGS. 1-2. For example, the monitoring manger 106 may be configured to perform at least a portion of the flowchart 200 as described in FIGS. 2, respectively.

The memory 306 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 306 is operable to store the memory manager instructions 308 and/or any other data or instructions. The memory manager instructions 308 may include any suitable set of instructions, logic, rules, or code operable to execute the memory manager 106.

The network interface 304 is configured to enable wired and/or wireless communications. The network interface 304 is configured to communicate data between the central monitoring server 102 and other devices (e.g. source monitoring server 112a and destination monitoring server 112b), systems, or domains. For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

It may be noted that one or more other components shown in FIG. 1 may be implemented by a hardware device having a similar structure to the central monitoring device 102 shown in FIG. 3. For example, each of the monitoring servers 112 and 116, monitoring agents 120, computing nodes 118, the central client device 104 and the deployment server 130 may have a similar structure shown in FIG. 3. For example, each of these devices may include a network interface to communicate with other devices within the network 150 and a processor operatively coupled to a memory storing instructions which when executed by the processor implement a functionality of the device as described with reference to FIG. 1.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a deployment server configured to deploy a set of monitoring agents at a plurality of host computing nodes in an enterprise network, wherein each of the set of monitoring agents monitors at least one parameter related to one or more of the host computing nodes;
   a central monitoring device operatively coupled to the deployment server, wherein the central monitoring device comprises a processor configured to:

obtain user input to deploy a monitoring agent of the set of monitoring agents at a host computing node of the plurality of host computing nodes;

identify, based on the user input, a job to be executed by the deployment server to deploy the monitoring agent at the host computing node, wherein the job includes a set of steps to deploy the monitoring agent at the host computing node;

identify an execution time window to execute the job at the host computing node, wherein the execution time window includes a time interval within which the job can be executed at the host computing node;

trigger execution of the job at the deployment server within the execution time window to cause the deployment server to deploy the monitoring agent at the host computing node;

receive a unique identification (ID) of the execution of the job from the deployment server;

determine an estimated time to be taken to complete executing the job;

re-access the deployment server using a service account after the estimated time has elapsed starting from triggering the execution of the job; and retrieve results of the execution of the job based on the ID.

2. The system of claim 1, wherein the processor is configured to determine the estimated time to be taken to complete executing the job based on one or more of historical data relating to time taken to execute the job at one or more host computing nodes similar to the host computing node, estimated time to communicate a copy of the monitoring agent to the host computing node and a processing latency associated with the host computing node.

3. The system of claim 2, wherein the processor is further configured to:

compare the estimated time to be taken to complete executing the job with the execution time window;

determine based on the comparison whether the estimated time window includes sufficient time to complete executing the job; and trigger the execution of the job when the execution time window is determined to include sufficient time to complete executing the job.

4. The system of claim 1, wherein the processor is further configured to:

generate an input file including information relating to one or more of an identity of the job, a path to access the job, the identity of the host computing node, a service role to be used for the deployment, and an estimated time to complete executing the job;

transmit the input file to the deployment server; and trigger the execution of the job at the deployment server based on the input file.

5. The system of claim 1, wherein the processor is further configured to:

identify a geographic location of the host computing node;

determine a first time zone of the identified geographical location;

determine the execution window in accordance with a second time zone associated with the central monitoring device;

determine a time of execution within the execution time window for executing the job based on the second time zone; and trigger the execution of the job at the determined time of execution.

6. The system of claim 1, wherein the processor is further configured to execute the job by executing a software program associated with the job, wherein the software program includes software code to perform the set of steps to deploy the monitoring agent at the host computing node.

7. The system of claim 1, wherein the processor is further configured to:

examine results of the execution of the job at the host computing node;

determine, based on the results, that the monitoring agent was not successfully deployed at the host computing node; and in response, re-trigger the execution of the job at the deployment server for re-deployment of the monitoring agent at the host computing node.

8. The system of claim 1, wherein the at least one processor is further configured to:

determine a level of authorization of the user, wherein the level of authorization identifies an extent of authorization of the user to execute jobs on one or more host computing nodes; and select the service account based at least on the level of authorization of the user.

9. The system of claim 1, wherein the at least one parameter is associated with availability or performance of the one or more computing nodes.

10. A method for deploying a monitoring agent at a host computing node, comprising:

obtaining user input to deploy the monitoring agent at the host computing node, wherein the monitoring agent monitors at least one parameter related to the host computing node;

identifying, based on the user input, a job to be executed by a deployment server to deploy the monitoring agent at the host computing node, wherein the job includes a set of steps to deploy the monitoring agent at the host computing node;

identifying an execution time window to execute the job at the host computing node, wherein the execution time window includes a time interval within which the job can be executed at the host computing node;

triggering execution of the job at the deployment server within the execution time window to cause the deployment server to deploy the monitoring agent at the host computing node;

receiving a unique identification (ID) of the execution of the job from the deployment server;

determining an estimated time to be taken to complete executing the job;

re-accessing the deployment server using the service account after the estimated time has elapsed starting from triggering the execution of the job; and retrieving results of the execution of the job based on the ID.

11. The method of claim 10, wherein the estimated time to be taken to complete executing the job is determined based on one or more of historical data relating to time taken to execute the job at one or more host computing nodes similar to the host computing node, estimated time to communicate a copy of the monitoring agent to the host computing node and a processing latency associated with the host computing node.

12. The method of claim 10, further comprising:

generating an input file including information relating to one or more of an identity of the job, a path to access the job, the identity of the host computing node, a service role to be used for the deployment, and an estimated time to complete executing the job;

transmitting the input file to the deployment server; and triggering the execution of the job at the deployment server based on the input file.

13. The method of claim 10, further comprising:

identifying a geographic location of the host computing node;

determining a first time zone of the identified geographical location;

determining the execution window in accordance with a second time zone associated with the central monitoring device;

determining a time of execution within the execution time window for executing the job based on the second time zone; and triggering the execution of the job at the determined time of execution.

14. The method of claim 10, further comprising:

examining results of the execution of the job at the host computing node;

determining, based on the results, that the monitoring agent was not successfully deployed at the host computing node; and in response, re-triggering the execution of the job at the deployment server for re-deployment of the monitoring agent at the host computing node.

15. The method of claim 10, further comprising:

determining a level of authorization of the user, wherein the level of authorization identifies an extent of authorization of the user to execute jobs on one or more host computing nodes; and selecting the service account based at least on the level of authorization of the user.

16. A non-transitory computer-readable medium storing instructions that when executed by a processor that the processor to perform a method for deploying a monitoring agent at a host computing node, the method comprising:

obtaining user input to deploy the monitoring agent at the host computing node, wherein the monitoring agent monitors at least one parameter related to the host computing node;

identifying, based on the user input, a job to be executed by a deployment server to deploy the monitoring agent at the host computing node, wherein the job includes a set of steps to deploy the monitoring agent at the host computing node;

identifying an execution time window to execute the job at the host computing node, wherein the execution time window includes a time interval within which the job can be executed at the host computing node;

triggering execution of the job at the deployment server within the execution time window to cause the deployment server to deploy the monitoring agent at the host computing node;

receiving a unique identification (ID) of the execution of the job from the deployment server;

determining an estimated time to be taken to complete executing the job;

re-accessing the deployment server using the service account after the estimated time has elapsed starting from triggering the execution of the job; and retrieving results of the execution of the job based on the ID.

17. The non-transitory computer-readable medium of claim 16, wherein the instructions further cause the processor to perform the method further comprising:

generating an input file including information relating to one or more of an identity of the job, a path to access the job, the identity of the host computing node, a service role to be used for the deployment, and an estimated time to complete executing the job;

transmitting the input file to the deployment server; and triggering the execution of the job at the deployment server based on the input file.

\* \* \* \* \*